United States Patent [19]

Fago, Jr.

[11] Patent Number: 4,815,055
[45] Date of Patent: Mar. 21, 1989

[54] DATA MEDIUM STORAGE AND RETRIEVAL DEVICES

[75] Inventor: Frank M. Fago, Jr., Mason, Ohio

[73] Assignee: Access Corporation, Cincinnati, Ohio

[21] Appl. No.: 39,660

[22] Filed: Apr. 17, 1987

[51] Int. Cl.⁴ .......................... G11B 5/48; G11B 17/00
[52] U.S. Cl. ...................................................... 369/36
[58] Field of Search .......................... 369/36, 37, 38, 39

[56] References Cited

U.S. PATENT DOCUMENTS

| | | | |
|---|---|---|---|
| 3,536,194 | 10/1970 | Novak | 209/80.5 |
| 4,502,133 | 2/1985 | Siryj et al. | 369/34 |
| 4,504,936 | 3/1985 | Faber | 369/34 |
| 4,519,060 | 5/1985 | Ycas | 369/77.2 |
| 4,608,679 | 8/1986 | Rudy et al. | 369/36 |
| 4,675,856 | 7/1987 | Rudy et al. | 369/36 |
| 4,682,313 | 7/1987 | Miyake | 369/39 |
| 4,685,095 | 8/1987 | Rudy et al. | 369/36 |

*Primary Examiner*—Steven L. Stephan
*Attorney, Agent, or Firm*—Wood, Herron & Evans

[57] ABSTRACT

A data cassette storage and retrieval device is provided having a gripper which moves linearly on the carrier of a cassette transporter to and from a storage crypt. The gripper carries a pair of pins having hooked ends which rotate into and out of engagement with the flange of a disc cassette. The gripper is operated by a mechanism which includes a chain which is driven around a pair of sprockets. The chain carries a drive pin which is linked to the gripper by way of an actuator plate which slides on the gripper only perpendicular to the path of the gripper. The actuator plate has a cam slot which rotates the pins by driving cam followers on the pins as the drive pin moves on the chain around a sprocket. Control switches and motors on the carrier are connected to the drive controls by a printed circuit board through a hollow shaft on which the carrier rotates on a movable elevator carriage of the transporter. A plastic ribbon cable connected to the printed circuit board is coiled around the shaft to accommodate its rotation.

32 Claims, 5 Drawing Sheets

DATA MEDIUM STORAGE AND RETRIEVAL DEVICES

The present invention relates to devices for storing and retrieving data medium cassettes and particularly to devices which include cassette changers for optical discs or other data storage media articles in discrete form.

It has become common in the design of computers to read and write data to and from changeable data storage medium cassettes including high density changeable magnetic and optical discs. Such discs are contained in a sealed cartridge or cassette case for protection. The cassettes are preferably designed to standard dimensions and are provided with standardized notches and flanges to facilitate gripping by automated changing devices.

Automated data storage and retrieval devices adapted for handling data storage medium cassettes must be positive and reliable, and must be able to move, grip and retain the cassettes with safety and speed. Such changers must cooperate with compartments designed for the storage of a plurality of cassettes arranged in rows and/or column arrays of storage crypts which are accessible for rapid transfer to and from disc drives and other reading and writing devices. This has precipitated the development of changing mechanisms which include transporters which move a cassette carrier among storage locations or between the storage crypts and the cassette players. These cassette carriers are provided with means for gripping cassettes in the storage crypts and moving them between the carriers and the playing or other storage locations.

The prior art devices have employed pairs of frictional belts for holding the cassettes to the carriers, or have employed pivotal grippers for holding cassettes to hook the cassette flanges to pull them onto the carriers. Such techniques have been less positive and reliable than desired in handling the data storage medium cassettes. Furthermore, devices of the prior art which rely heavily on electrical control systems to coordinate the interrelated operation and movement of the mechanical parts of the cassette gripper mechanism have a less than optional level of reliability of operation and risk of malfunction and resulting damage to the storage media. In addition, the various moving parts in these changing devices have required electrical components to be carried by the movable gripper and cassette carrier mechanisms, thus subjecting the systems to additional wiring requirements to provide the needed power and control.

It is a primary objective of the present invention to provide a data medium storage and retrieval device with a cassette gripper mechanism which is positive, reliable and efficient. It is a further objective of the present invention to provide a changer for data medium cassettes having standard flanged cases which employ economy of movement and safety in the handling of the medium cassettes, and which will function in a smooth, fast and dependable manner.

More particularly, it is an objective of the present invention to provide a device for storing and retrieving data storage medium cassettes which employs components which are mechanically linked to operate together and move and grip the cassettes smoothly, and positively so as to safely and efficiently handle the storage media with minimum risk of malfunction or injury to the cassettes or their contents.

According to the present invention, a data medium changer is provided with a transporter for moving a data handling carriage among a plurality of crypts in a storage compartment and the drive slot of a data reading and/or writing device such as a disc drive. The transporter includes a translatable carriage and rotatable carrier mounted on the carriage upon a hollow rotatable shaft through which the electrical conductors for the carrier pass, and which connects to control wiring in the frame of the transporter with a ribbon cable coil which allows for a flipping of the cassette for two sided play of the medium carried within the cassette.

In accordance with other aspects of the present invention, the invention further provides an extendible gripper mounted to the carrier for translating the cassettes into and out of the slots of the player and the storage crypts. In the illustrated and preferred embodiment, the grippers lock to the cassettes using a pair of pins which trap the cassette flanges against fixed finger-like projections on the gripper body by rotating about their axes to hook behind the cassette flanges to hold the cassettes against stripper or compression springs on the gripper body.

According to the invention, the offset heads of the gripper pins form hooks which are rotatably mounted on the gripper body and smoothly move behind the flanges of the cassettes and tighten against them driven by a mechanical linkage which rotates the gripper pins in locking and releasing the cassettes from the gripper. Extension of the gripper and the rotation of the pins are mechanically synchronized to allow rotation of the hooks formed on the ends of the pins to and from the locked positions behind the cassette flange when the hooks are beyond the flanges in the crypt or player slots. The hooks remain in gripping engagement with the cassette flanges when carrying the cassettes into, out of and with the carrier. Otherwise, they are oriented to pass beside the flanges to allow the gripper to move to a fully extended rest position adjacent to the slots.

The synchronization of the gripper operation and the positive and reliable handling of the cassettes is achieved in the preferred embodiment by a mechanism which includes a chain drawn around two sprockets on the carrier. The chain carries with it a drive pin which is linked to the gripper to extend and retract it, and is linked to the pins to move the hooked ends of the pins into and out of engagement with the cassette flanges. The linkage in the embodiment shown includes an activator plate which moves the gripper linearly on the carrier to slide the cassettes into and out of the player and storage crypt slots as the pin moves on the chain along the carrier. The activator plate is mounted to slide on the gripper perpendicular to the path of movement of the gripper as the pin moves on the chain around one of the sprockets. The actuator plate has a cam slot which engages a cam follower on the rear of the gripper pins to rotate the gripper pins as the activator plate slides across the translational path of the gripper. The rotation of the gripper pins and thus, the hooks, causes the hooks to engage or disengage a cassette.

According to the principles of the present invention, the cassette gripping and moving mechanism is responsive to a mechanical drive. In the embodiment illustrated, the drive operates to move a drive pin along a curved track defined by a chain routed around a pair of sprockets. The drive pin, which is linked to the chain, translates the gripper in a linear path on the carrier toward and away from the slots of the crypts and cassette drive as the drive pin moves parallel to the gripper's path. As the drive pin moves around one of the sprockets, it moves with a component perpendicular to the translational path of the gripper. This component imparts the above-mentioned sliding movement to the actuator plate which operates to rotate the gripper pins to their cassette engaging or disengaging orientations.

According to further principles of the present invention, the continuous movement of the drive in one direction moves the gripper from an extended rest position near the storage crypts and into the crypts where the hooks move to engage a cassette. The same continuous motion of the drive proceeds to then move the gripper back out of the crypts beyond the rest position to a fully retracted position as the engaged cassette is fully drawn onto the carrier and clear of the crypts for transport to and from the disc drive. By continuous motion of the drive in the opposite direction, the process is reversed as the gripper advances to insert the engaged cassette into a crypt or player slot, where the hooks move to disengage the cassette. The same continuous reversing motion of the drive proceeds to move the gripper back out of the crypts to the fully extended rest position. In the preferred embodiment, this is achieved by the linkage between the drive pin on the chain and the actuator described above. As the drive pin carried on the chain moves with the chain and reaches the furthest extent of the chain around the sprocket, the gripper pins reach beyond the flanges allowing clearance for the hooked ends of the pins to rotate behind the flange. As the chain continues its travel, the gripper retracts and the hooks engage the flange to lock the cassette to the gripper and pull the cassette out of the slot and onto the carrier. When the chain moves in the opposite direction, the cassette is pushed into a crypt. Near the end of this motion, as the drive pin begins to round the sprocket, the gripper and cassette are automatically decelerated by virtue of the movement of the drive pin around the sprocket. This helps avoid slamming of the cassette into the slot. When the cassette has come to a stop in the slot, the hooks move clear of the cassette flange and are then rotated out of engagement with the cassette flanges. The gripper and hooks then withdraw to the rest position. Stripper springs on the gripper push the cassette into the crypt until the gripper is withdrawn. These springs also function as compression elements to hold the cassette flange tight against the hooks as the cassette is being carried by the gripper.

The above described objectives and advantages and others will be more readily apparent from the following detailed description of the drawings in which:

Figure 1:
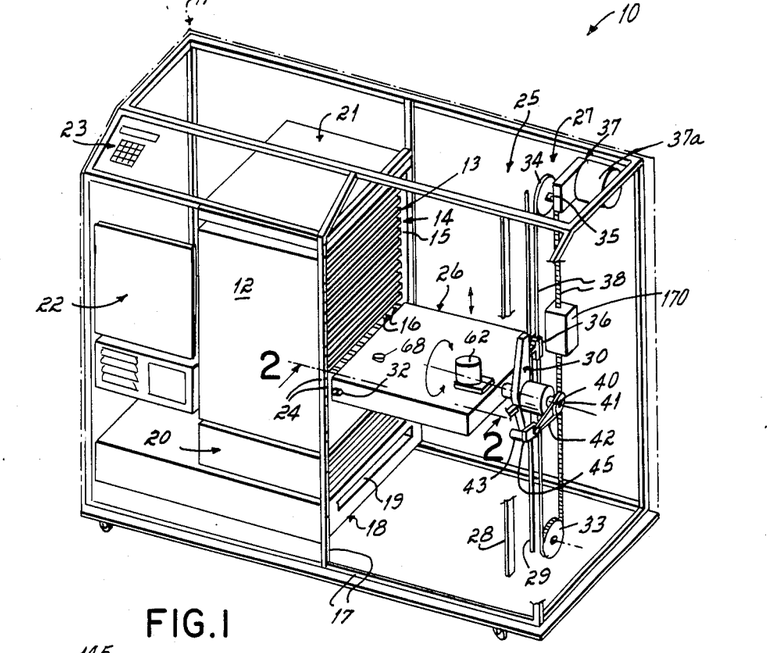
FIG. 1 is an isometric drawing of an optical disc storage and retrieval device having an optical disc changing mechanism according to the principles of this invention.

Referring to FIG. 1, an optical disc storage and retrieval device 10 is illustrated isometrically. It includes a cabinet 11 shown partially in phantom in the drawing and partially broken away. The unit includes a storage compartment 12 for storing a plurality of cassettes 13 containing data storage media such as optical discs. The storage compartment 12 includes a plurality of crypts 14 disposed in a vertical array, each crypt being adapted to receive through an opening or slot 15 and hold for storage the optical disc cassette 13 with each cassette oriented in a horizontal plane. The slots 15 are defined by the positions of cassette receiving rails 16 at the open side of the compartment 12.

The compartment 12 in the embodiment shown in FIG. 1 includes a vertical stack of twenty such crypts 14. The device 10 may be provided with a plurality of compartments 12 spaced horizontally to form a rectangular array of crypts 14, or may be arranged in some other configuration. The compartment 12 is supported in a frame 15 within the cabinet 11.

Mounted at the bottom of the housing 17 in vertical alignment with the cabinet 12 is an optical disc drive 18 for writing and reading information to and from a disc. The disc drive 18 includes a disc drive slot 19 which is oriented parallel to and in vertical alignment with the crypts 14. The slot 19 also receives the discs oriented in a horizontal plane. In the embodiment shown, a lower module 20 of the compartment 12 contains four of the twenty crypts 14. The lower module 20 is removable and may be replaced with a second disc drive if desired. In addition, an upper module 21 contains an additional crypt in the form of a horizontally movable storage drawer accessible from the front of the cabinet 11 to provide means for loading cassettes into and unloading cassettes from the device 10. The cabinet 11 also contains an electrical control module 22 for operating the device 10, and a user accessible control panel 23 electrically connected with the control module 22. Along the sides of each of the slots 15 of the crypts 14 is a reflective fiducial marker 24 to enable precise positioning of the disc changing mechanism 25 in the storage and retrieval of cassettes.

The device 10 includes the optical disc changing mechanism 25 mounted on the housing 17 adjacent the open side of the compartment 12 which carries slot 15 and drive 18 which carries the slot 19. The optical disc changing mechanism 25 includes a gripper/carrier assembly 26 and a transporter 27 for moving discs among crypts 14 or between a crypt 14 and the drive 18. In that all of the slots 15 and 19 in the illustrated embodiment are vertically aligned, the transporter 27 is, in effect, an elevator which raises and lowers cassettes from slot to slot. The transporter 27 is fixed to the frame 17 to the side of and in alignment with the center of the open side of the compartment 12. Where multiple storage compartments 12 are employed, as for example where a plurality of vertical columns of crypts are horizontally positioned to form a rectangular array of crypts 14, the entire transporter 27 would be provided with a mounting to render it movable along a track so that it may be drivably translated or rotated to various positions in alignment with the various compartments 12.

The transporter or elevator assembly 27 includes a vertical guide rail 28 and a vertically aligned elevator guide rod 29. Onto the guide rod 29 is slidably mounted an elevator carriage 30. To prevent its rotation about the guide rod 29, the carriage 30 is provided with a set of opposed rollers 31 which engage the rail 28. Most of the guide rail 28 and the transporter 27 is omitted from the Figures for clarity. The guide rail 28 functions to provide the carriage 30 with stability to maintain the alignment of the gripper assembly 26 with the crypts 14 of the compartment 12.

The vertical positioning of the carriage 30 on the rail 28 and guide rod 29 is aided by optical sensor 32 which is carried by the gripper carrier assembly 26. The sensor 32 detects fiducial markers 24 and thereby provides control information to the control module 22.

The transporter 27 is provided with a lower timing belt pulley 33 rotatably mounted on a horizontal shaft 40 (not shown) supported at the lower end of the frame 17. A similar pulley 34 is provided near the top of the frame 17. Pulley 34 is rigidly mounted on a rotatable shaft 35 which is connected to the output drive shaft of an elevator motor and transmission assembly 37 secured to the frame 17 near the top thereof. Both of the pulleys 33, 34 and their shafts have axes extending in the transverse direction. In the illustrations, the transverse direction refers to the direction from one side of the cabinet 11 to the other, and is the direction of the path of movement of the disc cassettes 14 as they slide into and out of the slots 15 and 19 of crypts 14 and drive 18 respectively.

The carriage 30 is held and moved along the guides 28 and 29 by a toothed belt 38 secured at both of its ends to a clamp 36 at the top of the carriage 30 and extending around the timing belt pulley 33 at the bottom of the frame 17 and from there around the drive pulley 34 at the top of the frame. The elevator motor 37a of the motor and transmission assembly 37 is a stepping motor which operates in response to control signals generated by the control module 22 to move the carriage 30 from crypt to crypt and from the crypt storage areas to the disc drive slot 19 of the disc drive 18. Carrier assembly 26 is at least partially counterbalanced by means of a counterweight 170 secured to belt 38 opposite carrier assembly 26 as shown. Preferably counterweight 170 is guided by rollers along a vertically disposed track (not shown). The motor 37a is electrically connected with the control module 22 by a wiring harness (not shown) fixed to the frame 17 and made up of control and power wire conductors.

The gripper carrier assembly 26 is rotatably supported on the carriage 30 by a hollow shaft 40 rotatably mounted on the carriage 30 transverse to the rail 28 and guide rod 29 and perpendicular to the plane of the slots 15 and 19. The shaft 40 is rigidly secured to the carrier assembly 26 at the end thereof facing the crypts 14. Rigidly mounted to the shaft 40 at the end opposite the carrier assembly 26 is a drive pulley 41 around which extends a drive belt 42. The gripper carrier assembly 26 is rotated on the shaft 40 by the operation of an electric rotator motor 43 mounted to the carriage 30. The motor 43 has an output shaft drivingly engaged in a transmission 45 having an output shaft 44 which drives the belt 42 to rotate the pulley 41 in the shaft 40. The remaining details of the disc changing mechanism 25 are more fully described with reference to FIG. 2.

Figure 2:
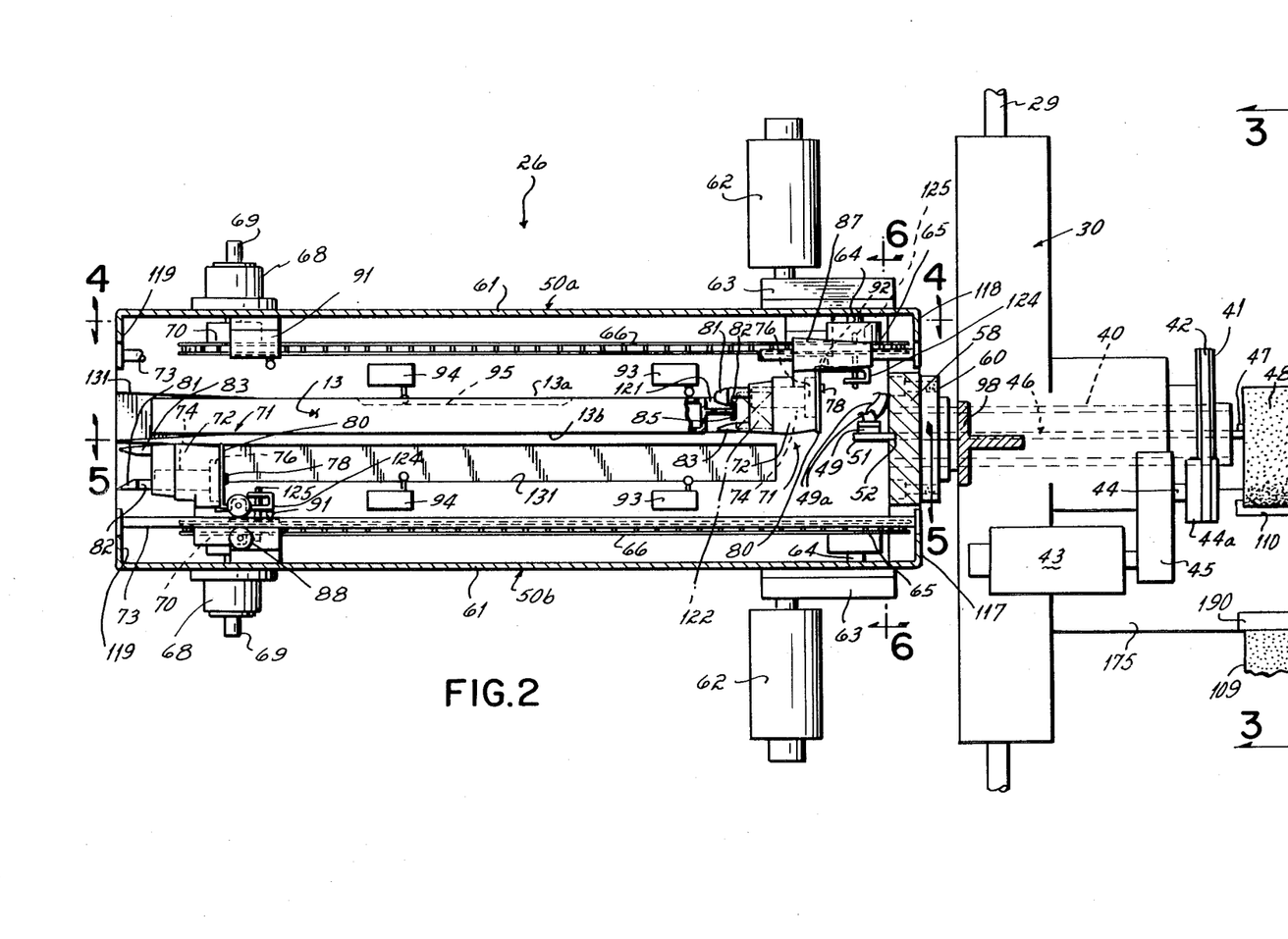
FIG. 2 is a cross-sectional elevational view of the optical disc changing mechanism of the device of FIG. 1 taken along line 2—2 of FIG. 1, showing a pair of gripper units joined together, whereby one is inverted with respect to the other.

Referring to FIG. 2, the gripper carrier assembly 26 is shown rotatably mounted through the hollow shaft 40 to the elevator carriage 30. The carriage 30 is shown slidably mounted to the rail 28 and guide rod 29 of the elevator 27. A drive pulley 41 is rigidly mounted at the end of the shaft 40. The carrier rotator motor 43 and transmission 45 are fixed to the carriage 30 with the pulley 44a of its output drive shaft 44 aligned in a vertical plane with the pulley 41. The pulleys 41 and 44a are drivably linked by the drive belt 42 which surrounds them. The gripper carrier assembly 26 thus rotates with the shaft 40 on the carriage 30 through 180° in response to the reversible operation of the motor 43. The 180° rotation allows the gripper carrier assembly 26 to flip the discs so that either side may be played at the disc drive 18 regardless of the initial orientation of the disc when retrieved from the storage crypt 14.

Figure 3:
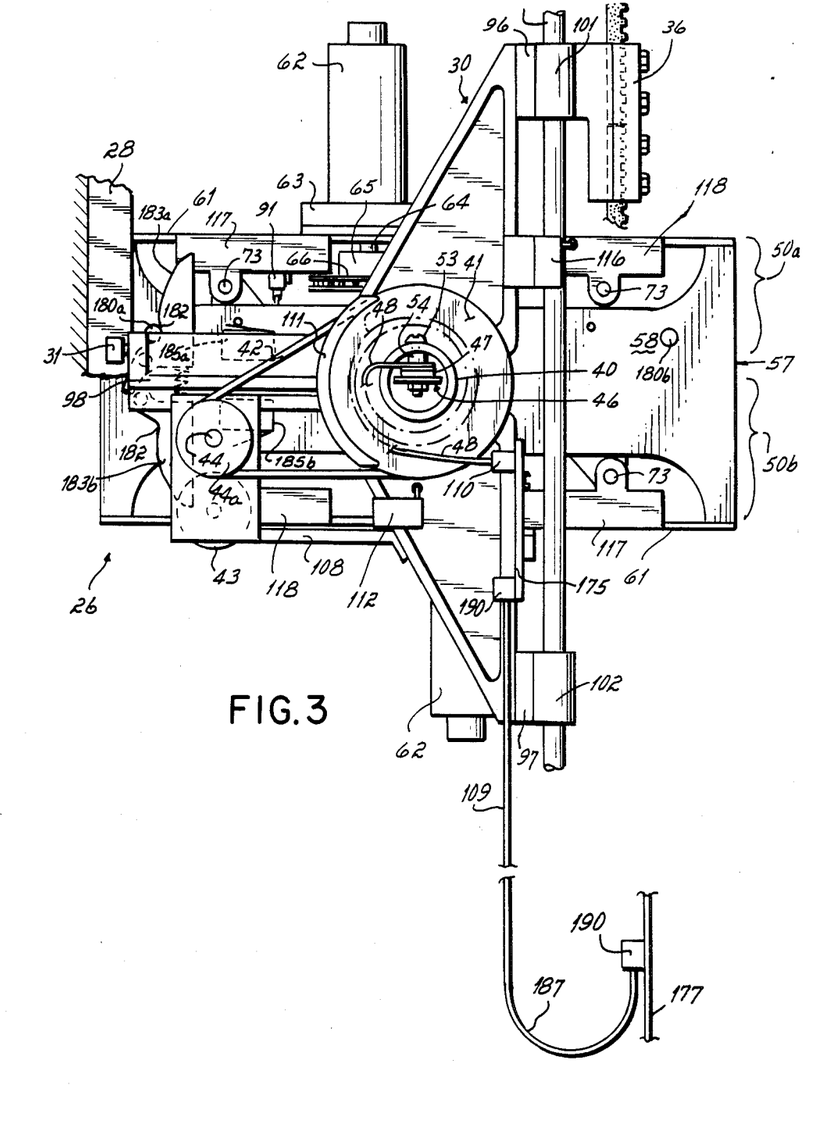
FIG. 3 is a side elevational view of the changing mechanism as seen along line 3—3 of FIG. 2.

The hollow shaft 40 carries within it the conductors necessary for the operation of the motor and control components on the gripper carrier assembly 26. The conductors are carried on a rigid printed circuit board strip 46 which extends axially inside the hollow shaft 40. The end of strip 46 closest to gripper modules 50 is in the form of a T-shaped head and has secured thereto by soldering or similar means a multiple-conductor connector 49a. Connector 49a is secured to a series of leads which are divided into a harness containing two wire bundles 49 which connect the identical upper and lower modules 50a, 50b of the carrier assembly 26 to the strip 46. The connector 49a is physically mounted and electrically connected to a T-shaped head 51 formed at the end of the printed circuit conductor strip 46. The T-shaped head 51 is supported in a slot 52 formed on the inside of the housing of the carrier assembly 26 to support one end of printed circuit strip 46. The printed circuit strip 46 is held securely in position at its opposite end by a screw 53 threaded into a standoff spacer 54 fixed to the board 46 to suspend printed circuit board 46 along its length inside hollow shaft 40 as is best seen in FIGS. 2 and 3.

The end of the printed circuit conductor strip 46 secured by screw 53 and spacer 54 as just described extends from the shaft 40 adjacent pulley 41. Secured to that end of strip 46 is another multiple-conductor connector 47. Connector 47 has connected to it a coil of plastic ribbon cable 48 which winds at least a full revolution about shaft 40 to provide the flexibility to accommodate the cyclical rotation of the hollow shaft 40 without unduly stressing the conductors of cable 48.

Preferably coiled cable 48 is a ribbon cable having a body made of resilient plastic material, such as duPont Mylar or the like, to impart a spring-like character to the coil. The other end of the ribbon coiled cable 48 is connected by a similar ribbon connector to a printed circuit board 175 which carries the driving circuitry for the rotator motor 43 as well as for the gripper drive motors 62. Printed circuit board 175, which travels with carriage 30, is connected to another printed circuit board 177 by way of a flexible ribbon cable 109 having connectors 190 at both ends. Board 177 contains the driving circuitry for the elevator motor 37a and is mounted in a fixed position with respect to the frame of device 10. Ribbon cable 109 forms a gentle loop 187 to avoid undue stress on its conductors and is sufficiently long to account for the full travel of carriage 30. Printed circuit board 177 is, in turn, connected to control module 122 by way of a wiring harness (not shown).

The gripper carrier assembly 26 is a dual gripper assembly carrying an upper gripper module 50a and a lower gripper module 50b. By providing two grippers 50a and 50b on the gripper assembly 26, excess travel by carriage 30 is avoided and operation is correspondingly quickened by providing the capacity for removing a cassette 13 from the drive 19 and replacing it with another without moving the carriage 30 to and from the crypts between the removal and replacement steps. Two identical gripper modules 50a and 50b are placed together, bottom to bottom, to form the gripper assembly 26 such that one gripper is inverted with respect to the other. Reference to a gripper module 50 refers to either gripper module 50a or 50b since each of the gripper modules 50a and 50b is identical in its structural details. Accordingly, the description with respect to either the gripper 50a or 50b will apply to the other. It must be bourne in mind that the relative orientation of the grippers 50a and 50b is reversed by 180°, with the gripper module 50a being right side up and the gripper 50b being up side down in the FIGS. The positions of the gripper modules 50a and 50b as shown in FIG. 2 further differ in that in gripper module 50a, the gripper is retracted and carrying a cassette 13 while in the gripper module 50b, the gripper is extended and carrying no cassette. Reference to module 50a, therefore, would accurately describe either of the modules 50 with the gripper retracted and carrying a cassette 13, while reference to module 50b would accurately describe either module 50 with the gripper extended. In an operation of the gripper assembly 26, the assembly may of necessity be inverted, that is rotated 180°, wherein module 50b would be top side up and in the upper half of the gripper assembly 26 while the module 50a would become inverted from that illustrated in the drawings. In other words, the reader should contemplate the fact that the positions of modules 50a, 50b are not permanent. Each of the gripper modules 50 is adapted to retrieve and transport an optical disc cassette 13 shown in FIG. 2 being carried by the upper gripper 50a.

The dual gripper carrier assembly 26 is made up of a carrier body 57 which is generally U-shaped, in plan view, but, in FIG. 2, is represented by only the cross-section through the base 58 of the body 57. It is in this base 58 that the slot 52 which supports the T-shaped head 51 of the printed circuit board 46 is formed on the inside of the carrier assembly 26.

Figure 4:
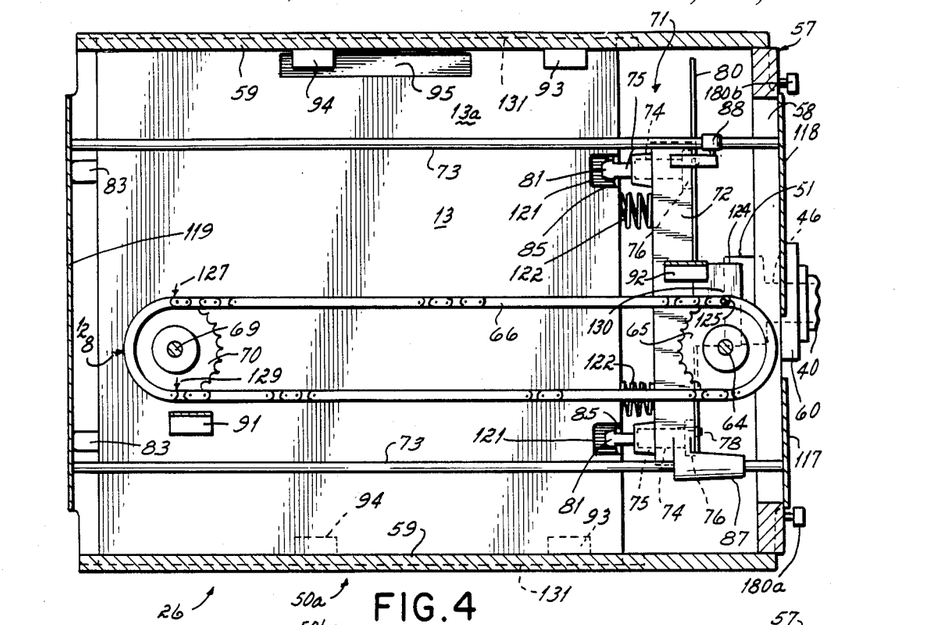
FIG. 4 is a partial, top cross-sectional view of the gripper unit of the changing mechanism taken along line 4—4 of FIG. 2, looking downward upon the upper gripper unit and showing it in a fully retracted position carrying an optical disc cassette.
Figure 5:
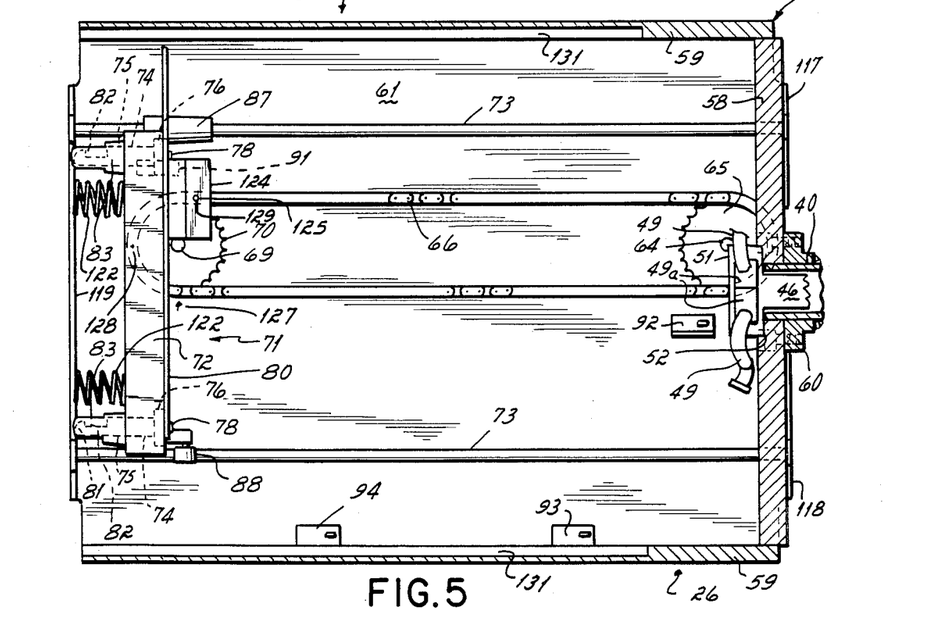
FIG. 5 is a cross-sectional view similar to FIG. 4 taken along line 5—5 of FIG. 2, and looking downwardly but seeing the bottom of the lower gripper unit, and showing it in a fully extended rest position carrying no cassette.

The U-Shape of the carrier body 57 can be most easily seen by reference to FIG. 4 which shows the base 58 and the two arms 59 which form the U-shape. As best seen in FIG. 5, the base 58 secures the gripper carrier assembly 26 to the shaft 40 through a mounting flange 60. The flanges 60 and base 58 are secured by bolts to form a rigid connection between the shaft 40 and the gripper assembly 26.

With further reference to FIG. 2, it can be seen that each of the gripper modules 50 includes a mounting plate 61 to which is mounted a reversible D.C. gripper drive motor 62 which is rigidly supported on the plate 61 through the housing of a motor gear box 63. The output of the gear box 63 is a drive shaft 64 which extends through the plate 61 to the inside of the gripper module 50 where it has rigidly supported thereon at its inner end a drive sprocket 65. An endless drive chain 66 loops around the sprocket 65 and extends along the module 50 to define a movable drive track. Also mounted to the plate 61 is a bearing assembly 68 which rotatably supports a shaft 69 which extends through the plate 61 to the interior of the gripper 50 and has supported thereto at its inner end an idler sprocket 70, around which the endless chain 66 also extends.

Each of the gripper modules 50 includes a gripper 71 which moves linearly on the carrier assembly 26 along a path toward and away from the slots 15 and 19 to transfer cassettes 13 to and from the crypts 14 or disc drive 18. The gripper 71 includes a gripper block 72 which is slidably mounted on a pair of parallel rails 73. As can be seen with reference to FIG. 2 and FIG. 5, gripper block 72 of module 50b at the lower left in FIG. 2, gripper block 72 has therein a pair of stepped bores 74 each having inserted therethrough a hook in the form of a gripper pin 75. The pin 75 has a cap 76 which fits into the large diameter of the stepped bore 74. The cap 76 has formed thereon and extending rearwardly therefrom an eccentrically located cam follower 78. The cam follower 78 fits through a slot in an actuator plate 80 which is mounted to the back of the block 72 and which holds the pins 75 into the bores 74 of the block 72. The pins 75, carried in the bores 74 in this manner, are rotatable within the bores by movement of their cam followers 78. This rotational movement will be better described in connection with the description of FIGS. 6, 7, and 8–12 below.

As is better illustrated in connection with the gripper 71 of module 50a at the upper right in FIG. 2, the pin 75 has an off-center, bullet-shaped head 81 which is formed into a hooked end 82 adapted to cooperate with a guide finger 83 formed integrally with the block 72 and extending forwardly from the block 72 below the head 81 of pin 75 to grip the flange 85, of T-shaped cross-section, in the case of cassette 13. This T-shaped flange is a conventional cassette design configured to be engaged by various gripping means of retrieval devices. This flange 85 is engagable by the hook 82 of the pin 75 upon rotation of the pin 75 in the bore 74. It should also be noted that the flange 85 is engagable by the hook 82 regardless of which side 13a, 13b of the cassette 13 is facing the hook 82.

By reference to the position of the pin 75 and block 72 in the gripper module 50b in which the gripper 71 is at the forward end of the rail 73, the disengaged position of the pin 75 and the off-center position of its head 81 is better illustrated. In that position, the hook 82 is rotated about 60° to a position where it would not engage a T-shaped connecting means 85 in the cassette 13 so the cassette could be inserted and withdrawn from the gripper. Referring to the details of gripper module 50b, it must be remembered that a gripper is in an upside down orientation with respect to the gripper module 50a in FIG. 2. Accordingly, the view of the lower gripper module 50b shown in FIG. 2 would effectively be a view from the bottom side of the upper gripper module 50a as shown in FIG. 2 were its gripper 71 in the extended position.

By comparison of the upper module 50a with the lower module 50b in FIG. 2 it can be seen that the block 72 is slidably mounted to the rail 73 on one side (as shown for the upper unit 50a) with a sleeve bearing 87. On its other side, the block 72 (as is shown in FIG. 2 for the lower module 50b) is slidably clamped to and rides upon to the rail 73 by a cooperating roller set 88. In this manner, the alignment of the block is maintained primarily with the sleeve bearing 87 which can move only transversely along one of the rails 73. On the other hand, because of the roller bearing 88 which holds the block 72 against a second rail 73, the horizontal orientation of the block 72 is maintained by preventing rotation of the block 72 at the sleeve bearing 87 about the first shaft 73. The bearing 88 will allow for transverse movement along the rail 73, and also will allow for lateral slippage to accommodate tolerances and to prevent binding on the rails 73.

Each of the gripper modules 50 contains four miniature limit switches 91, 92, 93 and 94. These limit switches 91–94 are connected through wiring (not shown) to the leads 49 through the circuit board conductors 46 in the hollow shaft 40 through the connector 47 to the ribbon cable coil 48 and from there to the control wiring in the frame to the control module 22 of FIG. 1. The limit switch 91 is the "full extension" detector which senses that the gripper 71 is fully extended (as illustrated in FIG. 2 for the gripper 71 of the lower module 50b). The limit switch 92 is a "full retraction" detector which is provided to sense that the gripper block 72 of the gripper 71 is in the fully retracted position (as illustrated in FIG. 2 for the gripper 71 of the upper module 50a). The limit switch 93 is the "in" detector for detecting that a disc cassette 13 is fully positioned within the gripper and ready for transporting as is the disc cassette 13 in the upper gripper module 50a in FIG. 2. The limit switch 94 is the "side" detector and functions to sense which side 13a, 13b of cassette 13 will be read by disc drive 18. The cassettes 13 are provided with a recess cavity 95 in one surface 13a of the cassette case as shown in FIG. 2. This standard cassette case configuration identifies the side of the disc. By providing for the detectors 94 to determine the orientation of the disc cassette 13 in the module, the cassettes 13 can be stored in an arbitrary orientation in the crypts 14. Thus, it is not necessary to flip the disc by a 180° rotation of the gripper assembly 26 solely for the purpose of storing the cassettes 13 "right-side-up" in a crypt. The cassettes can thus be stored in whatever orientation they are found or in which they were last oriented in the gripper assembly 26, avoiding unnecessary, time consuming motion.

Referring to FIG. 3, the side view of the gripper assembly 26 and the elevator carriage 30 are shown. The carriage 30 includes a pair of brackets 96 and 97 which are journalled to the shaft 29 through sleeve bearings 101 and 102. The carriage 30 also includes an oppositely extending arm 98 having mounted at the end thereof the pair of rollers 31 which engage opposed surfaces of the vertical rail 28. The carriage 30 is driven up and down the guide rod 29 and rail 28 by the traction belt 38. The belt 38 is secured at both its ends to the carriage 30 by a notched belt clamp 36 secured to the bracket 96 of the carriage 30.

The motor 43 is mounted to the carriage 30 by a motor support bracket 108. The output drive shaft 44 of the gear box 45 is drivably connected to the motor 43. The motor 43 turns the hollow shaft 40 through the drive belt 42 through the drive pulley 41 on the end of the shaft 40. The pulley 41 has on its edge, a 120° cam 111 which is used to operate a limit switch 112 provided to control the rotation of gripper carrier assembly 26. The printed circuit board 46 is supported on a spacer 54 axially along the inside of the hollow shaft 40. A limit switch 116 is mounted on the carriage 30 to determine the position of the carriage 30 on the rail 28 and rod 29, 29a.

Carrier body 57 has affixed to the outside of its base 58 on opposite sides thereof, a pair of rollers 180a, 180b. When the carrier body is fully rotated and in a horizontal position, one of rollers 180a, 180b engages a mating detent area 182 provided on a pair of corresponding spring-loaded rotator stops 183a and 183b which are affixed to the arm 98 of carriage 30. This provides a mechanical detent to hold the carrier body 57 in a horizontal orientation except when it is rotatably driven by motor 43. Also provided on opposed sides of arm 98 are a pair of limit switches 185a and 185b one of which is maintained actuated when the carrier body 57 is in a horizontal position. Unless one of switches 185a and 185b is actuated, control module 22 will not enable operation of the gripper drive motor 62 since in such a case, the carrier body 57 would not be properly aligned with either a crypt 14 or the disc drive loading slot 19.

The gripper assembly 26 is attached through the base 58 of the U-shaped body 57 at the opposite end of the shaft 40 as seen in FIGS. 3 and 5. The gripper carrier assembly 25 is enclosed by the plates 61 which close the upper and lower faces of the U-shaped body 57 and form the upper and lower gripper modules 50a and 50b, respectively. Mounted to these plates 61 as was described in connection with FIG. 2 are the reversible motors 62, connected to the plates through the gear boxes 63. The rear sprocket 65 of the upper module 50a is partially visible in FIG. 3. Formed integrally to the plates 61 is a pair of brackets 117 and 118 at the end adjacent base 58 and a bracket 119 at the end opposite base 58. These brackets support the guide rods 73 on the gripper modules 50a and 50b.

The structural construction and operation of the gripper units can be further understood by reference to FIG. 4 which is a top sectional view along the line 4—4 of FIG. 2 showing predominantly the components of the upper gripper module 50a. The module 50b is surrounded by the U-shaped body 57, which it shares with the lower module 50b. The U-shaped body 57 includes the base section 58 and the pair of arms 59. The brackets 117, 118 and 119 are shown supporting the guide rods 73. The bracket 119 similarly extends downwardly from the front of plates 61 and supports the front ends of the guide rods 73. Shown contained within the gripper module 50a is a cassette 13. The cassette 13 is shown with its side 13a facing up as indicated by the cavity 95 in its upper surface along one edge thereof shown at the top of FIG. 4. This is determined by the "side" detector limit switch 94 which senses this cavity 95 in side 13a or senses the absence of a cavity in side 13b. The limit switch 93 detects the presence of the upper surface of the disc cassette 13 in the gripper module 50.

In FIG. 4, the cassette 13 is being held within the gripper module 50 by the pins 75 of the gripper 71 which are hooked about the cassette flanges 85 of the cassette 13. The flanges 85 are defined by a pair of notches 121 in each side and on the opposite surfaces of the cassette 13 so that the disc cassette 13 can be carried by the gripper module 50a with either its "A" side 13a or its "B" side 13b facing upward. The guide fingers 83 of the upper module 50a are not visible in FIG. 4 because they are beneath and obscured by the pins 75 and cassette 13. However, the corresponding guide fingers 83 of the lower module 50b are visible extending outward beyond cassette 13 at the left of FIG. 4. The gripper 71 of the lower module 50b is in its fully extended position while that of module 50a is in the fully retracted position as indicated by the position of the gripper block 72. That the gripper 71 of the upper module 50a is fully retracted is verified by the detector 92 which preferably comprises a miniature limit switch 94. The cassette 13 is held snugly in the module 50 against the heads of the pins 75 by a pair of stripper springs 122. These springs function to eject the cassette from the gripper and also to hold them in the crypts 14 as they are released by the gripper block 72 as the gripper body 72 is withdrawn from the crypt 14 after depositing a cassette therein.

The movement of the gripper block 72 along the rails 73 is achieved by the chain 66 which is linked to a flange 124, projecting rearwardly from the actuator plate 80, by a drive pin 125. The chain 66 is a movable track which defines the motion of the drive pin 125. As the output shaft 64 from the gear box 63 turns, the sprocket 65 drives the chain 66 to move the block 72 forward (to the left in FIG. 4) along the rails 73. The block 72 slides on the rails 73 as explained in the discussion of FIG. 1 above by virtue of its mounting on the linear roller bearing 87 and the roller bearings 88.

The operation of the gripper modules 50 can be better understood with additional reference now to FIG. 5. The operation will first be described for the storing of a cassette 13 into a crypt 14, which corresponds to the movement of the gripper components from the positions shown in FIG. 4 to those shown in FIG. 5.

As the sprocket 65 turns counterclockwise in FIG. 4, rotating the chain 66 around it, the pin 125 moves in a transverse line from the position shown toward the left in FIG. 4 until it reaches the forward sprocket 70, illustrated as the point 127 adjacent the shaft 69 of the sprocket 70. From there pin 125 continues to move forward and around the sprocket 70 until it is at the point 128. In moving from point 127 to 128, the pin 125 moves both forward and sideways as it prescribes the circular arc about sprocket 70. As the pin 125 approaches the point 128, it changes from a direction parallel to the gripper's path to one perpendicular to the gripper's path, and accordingly, the speed of the gripper block 72 decreases to zero. The pin 125 will continue to move around pulley 70 from point 128 to point 129 where its motion will be stopped by actuation of the limit switch 91. As the pin 125 moves from point 128 to 129, it continues to move in the same sideways direction, but the component of its motion along the gripper path reverses and the gripper 71 will then begin to retract slightly back into the module 50. As gripper block 72 moves toward point 127, the block 72 will move forward at nearly constant speed until the pin 125 reaches point 127. Its forward velocity will then smoothly decelerate to zero at point 128, at which point, block 72 will reverse its travel. Then pin 125 will move back to the right in the FIG. 4 until it is at point 129 where it stops due to the actuation of limit switch 91 signaling the control module 22 to stop motor 62. When it is in position 129, gripper block 72 will be in the same position as that which the gripper block 72 of the lower gripper module 50b is shown to be in FIG. 5.

Referring further to FIG. 5, the lower gripper module 50b is shown. The gripper 71 is in the fully extended position with the pin 125 on the chain 66 being in the equivalent position 129. The flange 124 of the plate 80 is at this point in engagement with the limit switch 9 which caused the chain 66 to stop, and defining the extended position of the gripper block 72.

Considering FIG. 5 as if it were the bottom view of unit 50b shown in FIG. 4, the corresponding positions of the pin 125 are the following: when the gripper block 72 was in the fully retracted position as was shown in FIG. 4, the pin 125 would have been at the position 130 adjacent the sprocket 65. The rotation of the sprocket 65 for advancing the gripper 71 would have been in the clockwise direction in FIG. 5, in that this is the bottom view. The pin 125 would have moved from position 130 to position 127 adjacent the sprocket 70. Then it would have moved around the sprocket both advancing and moving sideways to the position 128. The pin 125 would have continued to move to that shown in FIG. 5 as position 129, having moved further in the same sideways direction but then retracting as it moved around the sprocket 70. It can be now seen that in moving from position 127 to position 129 the flange 124 was also carried sideways with the movement of the pin 125 moving the plate 80 a distance equal to the diameter of sprocket 70 across the path of travel of the block 57. The sideways movement of the plate 80 will cause the pin 75 to have rotated at least 45° and preferably about 60° from the positions of the corresponding pins in FIG. 4. The hooks formed on the pins 75 in FIG. 4 are in the gripped position securely engaging the cassette 55, while those of the pins in FIG. 5 are rotated to the released position.

The orientation of the rails 73 defines a linear path of movement for the grippers 71. The movement of pin 125 on the chain 66 drives the gripper block 72 along this path, since the gripper block 72 will move along the rails 73 in no other direction. The drive pin 125 is linked to the gripper block 72 through the actuator 80 which will not move with respect to the block 72 in a direction parallel to this path. The sideways movement of the actuator 80 on the gripper block 72 is across the path. The plate 80 is driven in this sideways direction with respect to the block 72 by component of the motion of the pin 25 across or perpendicular to the path of the gripper block 72 as the drive pin 125 as it circles the sprocket 70. This motion across the path of movement of the gripper 71 operates the pins 75. The mechanism for the rotation of the pins 75 is better shown in FIG. 6.

Figure 6:
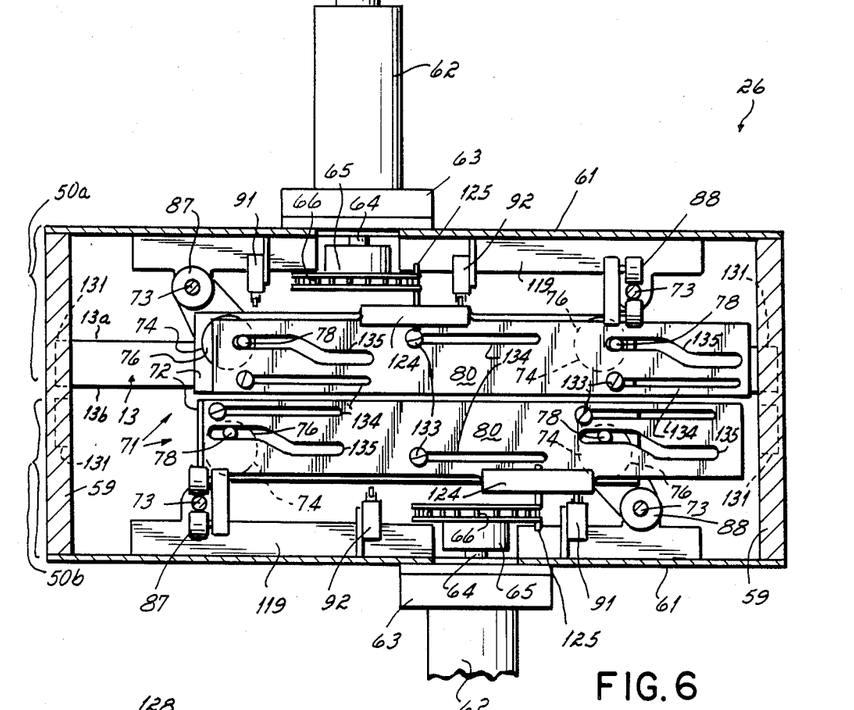
FIG. 6 is a side elevational cross-sectional view taken along line 6—6 of FIG. 2 showing the position of the gripper drive and gripping pin operating linkage with the upper gripper fully retracted and the lower gripper fully extended as shown in FIGS. 4 and 5 respectively.

Referring to FIG. 6, a cross-section through the gripper carrier assembly 26 shows the tool gripper unit bounded in section by the arms 59 of the U-shaped body 57 on the sides and the plate 61 on the top and bottom. The top half of the assembly 26 is the upper gripper module 50a and the lower half is the lower gripper module 50b. The upper gripper module 50a is shown as it was shown in FIG. 4 carrying a cassette 13 with the gripper 71 in the retracted position. The cassette 13 is carried by the gripper 50a with its edges riding in slots 131 in the opposite arms 59 of the body 57.

The caps 76 of the pins 75 are in the recesses of stepped bores 74 of the block 72 and are held there by the actuator plate 80 which is fastened flush with the back of the gripper block 72 with a plurality of machine screws 133 each passing through a horizontal slot 134 in the plate 80. The plate 80 is thereby slidably mounted across the back of the block 72.

The plate 80 is provided with a pair of Z-shaped cam slots 135 which guide the cam follower pin 78 of the pins 75. The cam followers 78 are spaced eccentrically from the center of the pin 75 so that, as the plate 80 is moved from the position shown which is toward the right in FIG. 6 to the left in that drawing, the cam follower 78 will follow the groove 135 and rotate the pin 75 through about 60° in the direction of the arrow 140. That rotation will be to the position of the pin 78 as shown in FIG. 6 in the lower module 50b where the arrow 140 is correspondingly shown. It should be remembered that the components module 50b are inverted from those of module 50a in that the arrangement of lower module 50b is upside down with respect to upper module 50a. The plate 80 of the lower module 50b is shown in the opposite position of the plate 80 for the module 50a in FIG. 6 which will be appreciated as long as the inverted relationship of the two modules is kept in mind.

As with FIGS. 4 and 5, the upper module 50a shown with the gripper 71 in its retracted position is detected in that position by the limit switch 94 being contacted by the flange 124 of the plate 80. In that position, the pin 125 on the chain 66 is adjacent to the rear sprocket 65 at point 130 on the drive shaft 64. With respect to the lower module 50b, the gripper is in its fully extended position, the pins 75 are rotated 90° with respect to the pin 75 of the upper module 50a, no cassette 13 is contained within the gripper module 50b and the grooves 131 in the arms 59 are empty. The fully extended position is detected by the limit switch 91 which is tripped by the position of the flange 124 of the plate 80. The pin 125 is at the forward pulley 70 at point 129 which is behind the rear pulley 65 shown in FIG. 6.

Figure 7:
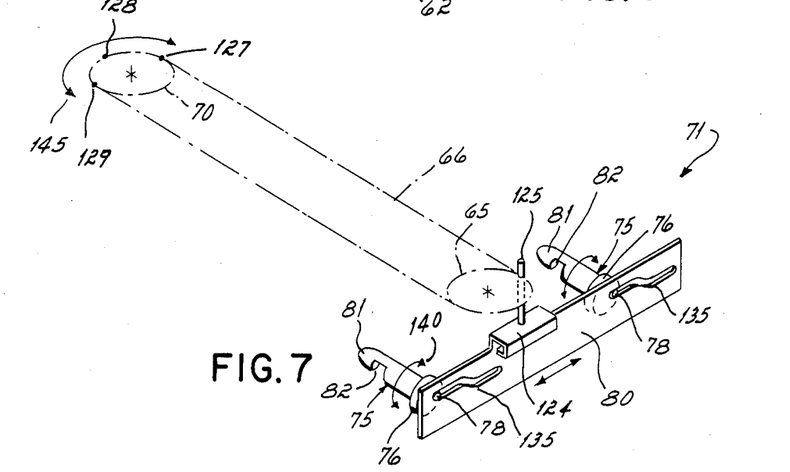
FIG. 7 is an isometric diagram illustrating the operation of the gripping elements of the mechanism shown in FIGS. 2-6.

The rotation of the pin 75 is more simply illustrated in FIG. 7. The diagram of FIG. 7 corresponds to the positions of elements of the upper gripper module 50a as illustrated in FIGS. 2, 4 and 6. There, the plate 80 is in the gripping position with the cam follower pins 78 at the leftmost ends in the figure of slots 135. The pin 125 is in position 130 adjacent the pulley 65 on the chain 66. Upon the movement of the chain 66 to drive the pin 125 forward toward the sprocket 70, the plate 80 is drawn forward. When the pin 125 reaches the point 127 adjacent sprocket 70, the pin 125 will move around the sprocket 70 as shown by the arrow 145 to slide the plate 80 correspondingly as illustrated by arrow 146. The movement of the actuator 80 in direction 146 causes the cam follower pins 78 to move with the Z-shaped cam slot 135 to cause the pins 75 to rotate in the direction of the arrow 140.

The sequence of operation of the gripper assembly 25 can be best understood by reference to the schematic diagrams of FIGS. 8, 9, 10, 11 and 12. These diagrams show the relationship of the pin 125 on the chain 66 (FIG. 8) the position of the cam follower 78 in the cam slot 135 of the plate 80 (FIG. 9), and the orientation and position of pin 75 in relation to the optical disc cassette 13 (FIGS. 10-12) at five points in time designated A(130), B, C(128), D, and E(129) in the FIGS. 8-12. Referring simultaneously to FIGS. 8-12, the sequence of operations of the gripper in storing and retrieving an optical disc cassette 13 from either one of the crypts 14 or the disc drive slot 19 is as follows.

The drawing most helpful for reference in connection with this operating sequence is the top sectional view of the gripper module 50a shown in FIG. 4. The operating sequence is described for the movement of the cassette 13 from the position shown in FIG. 4 to store it within one of the crypts 14 and then to retrieve a cassette 13 by the same gripper.

Figures 8, 9, 10, 11, 12:
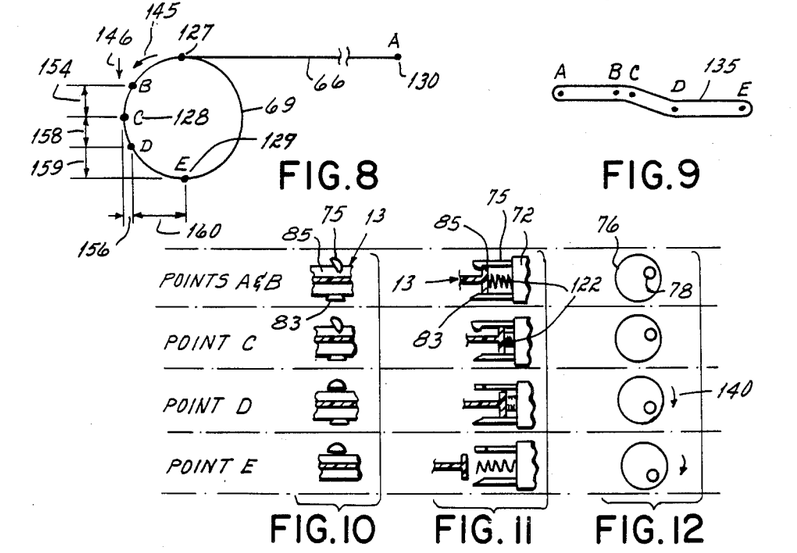
FIG. 8 is a diagram showing the positions of the gripper drive pin in relation to the drive chain and front sprocket at various positions of the chain.
FIG. 9 is a diagram showing the positions of the cam follower on the gripper pins on a plane across the path of movement of the gripper (as seen in FIG. 6) and corresponding to the various positions of the drive pin illustrated in FIG. 8.
FIGS. 10 through 12 are end, side and rear views of the gripper pins at positions A through E corresponding to the positions of the drive and cam as illustrated in FIGS. 8 and 9.

During the storage sequence, the gripper assembly 26 having been positioned by the transporter 27 so that the upper module 50a aligns with the slot of either the crypts 14 or disc drive 16, the pin 125 on the chain 66 will be in position A(130) as shown in FIG. 8. At this time, the plate 80 is positioned such that the cam follower 78 is at the position relative to the slot 135 of point A as shown in FIG. 9. The head 81 of the pin 75 is seated within the slot 121 of the cassette 13 and the T—shaped section 85 of the cassette 13 is positively locked between the pin 75 and the finger 83 of the gripper block 72, as diagrammatically illustrated for point A of FIGS. 10, 11, and 12.

As the controls of the unit 10 signal the beginning of a cassette storage operation, the motor 62 is activated to drive the sprocket 65 and to move the chain 66 to cause the pin 125 to move from point 130 to point 127. This motion will move the block 72 to advance the cassette 13 from the gripper module 50 and into the selected crypt 14 such that only a small portion of the cassette 13, that carrying the flange 85, still projecting slightly into the open end of the gripper 50. All of the other components represented in the diagrams of FIGS. 8-12 are in the same positions designated at point A.

As the pin 125 passes point 127 (FIG. 8), and proceeds around the sprocket 70 to point B, the sideways motion indicated by arrow 145 causes movement of the plate 80 the same distance as shown by arrow 146 to cause the cam follower 78 to move in relation to the slot 135 from point A to point B (FIG. 9). At this point, the pin 75 has not yet begun to rotate, but the cassette 13 has bottomed out in the slot of the crypt 14 causing the cassette 13 to move toward the block 72 and to compress the stripper spring 122 slightly. This causes a space to begin to open between the head 81 of the pin 75 and the flange 85 of the T—shaped portion of the cassette 13 (shown in part C of FIG. 11). This relieves the pressure between the head 81 of the pin 75 and the cassette 13. The chain 66 continues to be driven by the motor 62 at a constant speed advancing the pin 125 from point B to point C (FIG. 8). This causes the plate 80 to move the distance 154 corresponding to the lateral movement of the pin 125 to the position C (FIG. 9). This causes the gripper pin 75 to advance toward the cassette the additional distance 156 (FIG. 8) developing a space equal to the distance 156 between the pin head 81 and the flange 85 of the cassette 55 as shown in part C of FIG. 11.

The chain 66 continues to be driven at constant speed advancing the pin 125 from point C to point D through the top center position 128 where the motion of the pin head 81 in relation to the cassette 13 has come to a stop and begun to reverse direction. During the movement of the pin 125 from point C to point D (FIG. 8), most of its motion is in the lateral direction. Therefore, the motion it imparts is on the plate 80, causing the plate 80 to move the cam follower 78 on the head of 76 of pin 75 causing the pin to rotate about 60° and to disengage the cassette 13 as the pin orientation changes from that shown in parts C to that shown in parts D in FIGS. 10–12.

The chain 66 will continue to be driven a constant speed to move the pin 125 from point D to point E(129) (FIG. 8). This motion causes the plate A to move further laterally from point D to point E (FIG. 9). This motion of the plate 80 has no further operative affect, but merely accommodates the additional lateral motion of the pin 125 in circling the sprocket 70. The transverse motion, however, that in the direction of the cassette and gripper into and out of relationship with the crypt 14 is shown as 160 in FIG. 8. In moving from point D to point E, the pin 125 will continue to move the gripper 71 and will withdraw the grippers 71 from the crypt 14 and out of relationship with the cassette 13, thus providing clearance for further movement for repositioning of the gripper assembly 26 by motion of the elevator 29. The resting position is that shown in part E of FIGS. 10–12, and corresponds to the position of the lower gripper module 50b in FIGS. 2 and 5.

At this point, the gripper assembly 26 will be moved vertically into another crypt 14 or to the disc drive 18 to retrieve another cassette 13. Once positioned, the gripper module 50 will operate to retrieve the stored cassette 13 by a reversal of the steps described above in relation to FIGS. 8–12. The movement will proceed in the reverse order in E through A whereby the pin 75 of the gripper 71 will reach into the crypt 14, engage the flange 85 of the cassette 13 by a rotation of the pin in the opposite direction of the arrow 140 (FIG. 12) to grip the flange 85 and withdraw the cassette 13 from the crypt 14 proceeding through positions B to A in FIGS. 8–12. This slows the cassette 13 into the gripper module 50 for transportation to another location and returning to the position as illustrated in detail in FIGS. 2–6 above.

The positioning of the gripper assembly 26 for storage or retrieval of a cassette 13 proceeds with a control signal to energize the motor 37a to drive the elevator carriage 30 vertically to the designated crypt 14 or to the disc drive slot 19. To aid in the precise positioning of the assembly 26 adjacent the designated destination, the assembly 26 is provided with the electrical sensing means (not shown) on the forward edge of the gripper assembly 26 to sense the fiducial markers 24 along the sides of the storage compartment 12. The fiducial markers comprise reflective strips adjacent each crypt location to verify the elevator 27 is positioned vertically adjacent a valid crypt location. The fiducial markers are sensed by the optical sensor 32 mounted on the gripper carrier assembly 26.

When a cassette 13 is to be retrieved from a crypt 14 or from a disc drive slot 19, it will be retrieved in the manner described above without any orientation of the gripper assembly 26 by rotation on the elevator carriage 30. Once the cassette 13 is within the gripper assembly 26, the presence of the cassette 13 is detected by sensor 93 and the full retraction of the gripper block 72 is detected by limit switch 94. This signals the control module 22 to proceed with placement of the cassette 13 in the next assigned slot 15 or 19. This will be done by actuation of the motor 37a to drive the carriage 30 vertically to deliver the cassette 13 to the assigned destination. Where the cassette has been retrieved from a crypt 14, the next destination would be, for example, the disc drive slot 19. Therefore, the motion of the elevator 30 will be downward to the disc drive 18.

Control module 22 signals whether it is side "A" 55a or side "B" 55b of the cassette in module 50a which is to be read from or written to at the disc drive 18. If the correct side of the cassette is not in a playable orientation with respect to the drive 18, that fact will be detected by the side detector 94 and a signal will be generated by control module 22 to cause motor 43 to rotate the gripper assembly 26 on the shaft 40 to invert the upper and lower cassettes. If rotation of cassette 13 is required, the rotation cannot begin until limit switch 92 indicates that gripper block 72 is fully retracted and limit switch 93 indicates the cassette 13 is inserted fully into module 50. Once these conditions are satisfied rotation of gripper assembly 26 is commenced. To minimize cycle time, rotation preferably takes place at least partially during the time the carriage 30 is in transit between the crypt location from which the cassette 13 was fetched to the disc drive slot 19 or other location into which the cassette 13 will be inserted.

Frequently, the disc drive 18 will contain another cassette 13. Therefore, retrieval of the previously used cassette 13 will be required. That is achieved by positioning the empty lower module 50b adjacent the slot 19 and withdrawing the cassette 13 that is within the disc drive slot 19 in the same manner as was described above. When that is completed, a cassette 13 will be contained in each of the modules 50a or 50b, with the module 50a containing the next cassette 13 to be used, and the module 50b containing the cassette 13 to be returned to storage.

The cassette 13 contained in slot 50a will then be inserted into the slot 19 as described above. The elevator motor 37a will operate to lower the carriage 30 to index the upper module 50a of the gripper assembly 26 into alignment with the slot 19. Motor 62 will then be actuated in accordance with the procedure described in connection with FIGS. 8–12 above to insert the last retrieved cassette 13 into the disc drive slot 19.

When the disc drive 18 is loaded, the control module 22 will energize the elevator motor 37a to raise the carriage 30 to return the cassette 13 which is in the lower module 50b from the disc drive 18 to a storage crypt 14. When the module 50b is positioned vertically adjacent to the appropriate crypt 14 for storage of the cassette 13, a sequence will operate as described above to actuate the motor 62 and to insert the cassette 13 in its proper storage crypt.

What is claimed is:

1. A device for storing and retrieving data cassettes having a flange thereon, said device comprising:
   a storage compartment having a plurality of crypts therein for receiving data cassettes,
   a cassette transporter having a frame and a carriage movable on said frame among locations juxtaposed said crypts,
   a gripper mounted on said carriage and movable thereon along a pat between an extended position adjacent said crypts and a retracted position, remote therefrom,
   at least one pin having a shoulder formed thereon, said pin having a longitudinal axis disposed substantially parallel to said path and being mounted on said gripper for rotation about said axis to move said shoulder between a cassette-engaging orientation and a cassette-disengaging orientation,
   a drive motor mounted on said carriage for advancing and retracting said gripper along said path, and a linkage connected between said gripper and said pin, said linkage operating to rotate said pin in accordance with the position of said gripper along said path to move said shoulder from said cassette-engaging orientation to said cassette-disengaging orientation as said gripper moves respectively from said retracted position to said extended position and to move said shoulder from said cassette-disengaging orientation to said cassette-engaging orientation as said gripper moves respectively from said extended position to said retracted position.

2. The device of claim 1 wherein said linkage comprises:
a cam follower drivably connected to said pin to rotate said pin as said cam follower is moved, and
a cam engageable with said cam follower said cam being movable with said gripper and shaped to move said cam follower in response to the position of said gripper along said path.

3. The device of claim 1 wherein said linkage comprises:
a pair of curved drive elements, each rotatably connected to said carriage adjacent opposite ends of said path,
an endless band extending around said curved drive elements, and
a link connecting said band with said gripper, said link being movable along said path and around said curved drive elements.

4. The device of claim 1 further comprising a fixed guide formed on said gripper juxtaposed said pin and extending parallel to said longitudinal axis of said pin, said projecting being positioned for guiding said flange of a cassette into engageable relation with said gripper pin as said gripper moves from said retracted position toward said extended position to fetch a cassette from one of said crypts.

5. The device of claim 1 wherein said pin includes a cam follower on the surface thereof and said actuator plate includes a cam surface formed thereon and maintained in operative engagement with said cam follower.

6. The device of claim 1 further comprising motion control means on said carriage for guiding the movement of a drive link associated with said linkage along a curve from a direction parallel said path to a direction transverse said path to smoothly decelerate the motion of said gripper along said path.

7. The device of claim 2 wherein said cam comprises an actuator having a slot therein and said cam follower comprises a pin received within said slot.

8. The device of claim 2 wherein said slot is a substantially Z-shaped slot.

9. The device of claim 1 wherein said linkage comprises:
an actuator plate reciprocable transversely of said path, said pin being drivably connected to said actuator plate to rotate said pin between said cassette-engaging and cassette-disengaging orientations in response to said transverse reciprocation.

10. The device of claim 9 wherein said linkage further comprises:
drive means connected to said drive motor for effecting both reciprocation of said actuator transversely of said path and movement of said gripper along said path between said extended and retracted positions.

11. The device of claim 1 further comprising motion control means on said carriage for guiding the movement of a drive link associated with said linkage along a curve from a direction transverse said path to a direction parallel said path to smoothly accelerate the motion of said gripper along said path.

12. The device of claim 6 wherein said drive link meets said curve when said gripper traverses a region of said path adjacent said extended position.

13. The device of claim 11 wherein said drive link meets said curve when said gripper traverses a region of said path adjacent said extended position.

14. A device for storing and retrieving data medium cassettes, said device comprising:
a storage compartment having a plurality of crypts therein,
a cassette transporter having a frame and a carriage movable on said frame among said crypts,
a gripper mounted on said carriage and movable in a linear path between an extended position adjacent said crypts and a retracted position remote therefrom,
means on said gripper for selectively engaging and disengaging a cassette, said means including a cam follower on a surface thereof,
a pair of sprockets mounted on said carriage and spaced along said path,
a chain extending around said sprockets,
an actuator on said gripper connected to said chain and movable transversely of said path, said actuator including a cam in drivable engagement with said cam follower to move said means on said gripper between a cassette-engaging orientation and a cassette-disengaging orientation in response to said transverse movement of said actuator.

15. The device of claim 14 including a link connecting said chain to said actuator for driving said gripper along said path between said retracted and extended positions when said link is moving with said chain between said sprockets, and for moving said actuator transversely of said path when said link is moving with said chain around one of said sprockets.

16. The device of claim 14 wherein said engaging and disengaging means comprises at least one pin rotatably mounted on said gripper, each pin having a longitudinal axis parallel to said path and a head rotatable about said axis oriented toward said crypts, said heads having a cassette-engaging shoulder.

17. A device for storing and retrieving data cassettes, said device comprising:
a storage compartment having a plurality of crypts therein for receiving data cassettes,
a cassette transporter having a frame and a carriage movable on said frame among locations juxtaposed said crypts, a shaft rotatably mounted thereon,
a cassette carrier supported on said shaft to rotate through at least 180° on said carriage,
rotary drive means for rotating said carrier on said at least a portion of said carriage being supported for rotation by a shaft,
a gripper mounted on said carriage for selectively engaging and disengaging said cassettes,
electrical components disposed partially on said carriage and partially elsewhere on said frame for operating said carriage, and
at least one electrical conductor traversing the interior of said shaft electrically connecting said portion of said electrical components on said carriage with said portion of said electrical components disposed elsewhere on said frame.

18. The device of claim 17 further comprising an elastically bendable ribbon cable having an end electrically connected to said conductor, said cable being coiled about the axis of said shaft to accommodate rotation of said portion of said carriage without unduly stressing said cable.

19. The device of claim 17 wherein said electrical components include a motor mounted on said carriage.

20. The device of claim 17 wherein said electrical components include position sensing switches mounted on said carriage.

21. The device of claim 17 wherein said shaft is a hollow shaft and said conductor extends at least partially through the interior of said hollow shaft.

22. The device of claim 21 further comprising a printed circuit board extending at least partially through said hollow shaft.

23. The device of claim 22 further comprising:
a ribbon cable on said transporter and coiled about at least a portion of at least one of: (a) said shaft and (b) said printed circuit board.

24. The device of claim 17 wherein said portion of said electrical components disposed on said carriage include means for sensing a side of said cassette.

25. A device for storing and retrieving data cassettes having a flange thereon, said device including a cassette transporter, comprising:
a gripper mounted on said transporter and movable thereon in a path between an extended position and a retracted position,
at least one pin rotatably mounted on said gripper, said pin being adapted to grip and release said cassette upon rotation of said pin,
a reversible drive mechanism mounted on said carriage and drivably linked to said gripper, said mechanism being drivable in one direction for advancing said gripper toward said extended position and in the opposite direction for reversing said gripper toward said retracted position,
linkage operatively connected between said drive mechanism and said pin so as to rotate said pin when said gripper is in said extended position to cause said pin to engage the flange of said cassette while said drive mechanism is reversing and to engage the flange of said cassette while said drive mechanism is advancing, said drive mechanism including:
an output drive element chain means for moving said drive element along said path,
sprocket means operable in cooperation with said chain means when said gripper is in said extended position for moving said drive element across said path,
said gripper being connected to said drive element and movable in response to the movement of said drive element along said path, and
said linkage being connected to said drive element and operable in response to the movement of said drive element across said path.

26. The device of claim 25 wherein said linkage includes:
an actuator slidably mounted on said gripper so as to be movable with respect thereto across said path and immovable with respect thereto along said path,
said actuator being pivotally connected to said drive element and drivably connected to said pins so as to move across said path to rotate said pins as said drive element moves across said path with said chain means.

27. A device for storing and retrieving data cassettes, said device comprising:
(a) a plurality of crypts for holding cassettes;
(b) a carriage movable among locations juxtaposed said crypts;
(c) a cassette gripper mounted on said carriage and movable thereon along a path between an extended position adjacent said crypts and a retracted position remote therefrom;
(d) a drive motor for moving said gripper, and
(e) mechanical motion control means interposed between said drive motor and said cassette gripper for smoothly
(i) decelerating said gripper along said path as said gripper moves toward said extending position from said retracted position and,
(ii) smoothly accelerating said gripper along said path as said gripper moves from said extended position toward said retracted position in order to reduce jarring of the cassettes.

28. The device of claim 27 wherein said motion control means comprises:
(a) a curved drive element,
(b) a band driven by said motor and traversing said drive element, and
(c) a link connecting said band with said gripper, said link being movable around at least a portion of the curve of said drive element, said gripper being decelerated along said path as said gripper moves toward said extended position and accelerated along said path as said gripper moves away from said extended position due to the movement said link transversely of said path.

29. A device for storing and retrieving data cassettes, said device comprising:
(a) a plurality of crypts for holding cassettes;
(b) a carriage movable among locations juxtaposed said crypts;
(c) a cassette gripper mounted on said carriage and movable thereon along a path between an extended position adjacent said crypts and a retracted position remote therefrom said gripper including means for selectively engaging and disengaging said cassette, and
(d) biasing means on said gripper for at least one of:
(i) urging said cassette along a direction parallel to said path into firm engagement with said selective engaging and disengaging means when said means are positioned to engage a cassette, and
(ii) stripping said cassette away from said gripper when said selective engaging and disengaging means are moved from an engaging to a disengaging position to release a cassette.

30. The device of claim 29 wherein said selective engaging and disengaging means comprises at least one pin having a shoulder formed thereon, said pin having a longitudinal axis disposed substantially parallel to said path, said pin being mounted for rotation about said axis between a cassette-engaging orientation and a cassette-disengaging orientation, said biasing means acting to force said cassette into engagement with said shoulder when a portion of said cassette is interposed said gripper and said shoulder and to strip said cassette away from said gripper when said shoulder is rotated free of said portion of said cassette.

31. The apparatus of claim 30 wherein said biasing means comprises a spring mounted on said gripper.

32. A device for storing and retrieving data medium cassettes having a flange thereon, said device comprising:

- a storage compartment having a plurality of crypts therein, each crypt having a slot at one side thereof for receiving a data medium cassette therethrough,
- a cassette transporter having a frame and a carriage movable on said frame among points adjacent said slots,
- a gripper mounted on said carriage and movable thereon in a path between an extended position toward said slots and a retracted position,
- a link carried on said carriage, said link being drivably linked to said gripper,
- means on said carriage for moving said link along said path in one direction for advancing said gripper toward said path in one direction and in the opposite direction for reversing said gripper toward said retracted position,
- a pulley rotatably mounted on said carriage for moving said link across said path when said gripper is in said extended position,
- flange engaging means on said gripper operable to grip and release said cassette in response to the movement of said link across said path,
- a drive track in the form of a movable band extending along said path and around said pulley, said band having a portion extending along said path and a portion extending across said path, said link being movable on said band,
- an actuator plate slidably mounted on the gripper so as to move with respect to the gripper across said path,
- said band being longitudinally movable on said carriage along and across said path, said link being pivotally connected to said actuator plate, said element being fixed to said track and longitudinally movable therewith.

* * * * *

UNITED STATES PATENT AND TRADEMARK OFFICE
CERTIFICATE OF CORRECTION

PATENT NO. : 4,815,055
DATED : March 21, 1989
INVENTOR(S) : Frank M. Fago, Jr.

It is certified that error appears in the above-identified patent and that said Letters Patent is hereby corrected as shown below:

Col. 12, line 12, "9" should be -- 91 --.

Col. 18, line 53, after "crypts," delete "a shaft rotatably mounted thereon, a cassette carrier supported on said shaft to rotate through at least 180° on said carriage, rotary drive means for rotating said carrier on said".

Col. 21, line 22, after "said", delete "path in one direction" and insert -- extended position --.

Signed and Sealed this

Seventeenth Day of October, 1989

Attest:

DONALD J. QUIGG

Attesting Officer

Commissioner of Patents and Trademarks